(12) United States Patent
Toillon et al.

(10) Patent No.: US 9,713,992 B2
(45) Date of Patent: Jul. 25, 2017

(54) TRANSMISSION SYSTEM FOR AVIONICS APPLICATION DATA

(71) Applicant: THALES, Neuilly sur Seine (FR)

(72) Inventors: Patrice Georges Paul Toillon, Meudon la Foret (FR); Vincent Christophe Cédric Sollier, Meudon la Foret (FR); Paul Marie Boivin-Champeaux, Meudon la Foret (FR); David José Faura, Meudon la Foret (FR)

(73) Assignee: THALES, Neuilly sur Seine (FR)

( * ) Notice: Subject to any disclaimer, the term of this patent is extended or adjusted under 35 U.S.C. 154(b) by 476 days.

(21) Appl. No.: 14/558,557

(22) Filed: Dec. 2, 2014

(65) Prior Publication Data
US 2016/0347267 A1 Dec. 1, 2016

(30) Foreign Application Priority Data

Dec. 3, 2013 (FR) ...................................... 13 02814

(51) Int. Cl.
*G06F 11/00* (2006.01)
*B60R 16/023* (2006.01)
(Continued)

(52) U.S. Cl.
CPC ............ *B60R 16/023* (2013.01); *H04L 1/008* (2013.01); *H04L 1/0041* (2013.01); *H04L 1/0061* (2013.01); *H04L 2012/4028* (2013.01)

(58) Field of Classification Search
CPC .................. H04L 1/0041; H04L 1/0061; H04L 2012/4028; B60R 16/023
See application file for complete search history.

(56) References Cited

U.S. PATENT DOCUMENTS

| 6,418,117 B1 * | 7/2002 | Shah | ........................ H04L 45/00 370/225 |
| 7,536,631 B1 * | 5/2009 | Yang | ...................... H03M 13/13 714/747 |

(Continued)

FOREIGN PATENT DOCUMENTS

FR 2878097 A1 5/2006
WO WO 00/65765 A1 11/2000
(Continued)

OTHER PUBLICATIONS

Search Report dated Sep. 16, 2014 for French Patent Application No. 1302814 filed on Dec. 3, 2013.

(Continued)

*Primary Examiner* — Esaw Abraham
(74) *Attorney, Agent, or Firm* — Knobbe, Martens, Olson & Bear, LLP

(57) ABSTRACT

A transmission system for avionics application data is disclosed. In one aspect, the system is for transmitting avionics application data between data producing means and data consuming means, the application data being transmitted in the form of data transmission units, each including: at least one portion of an application message, and an additional message containing identification and control information. The additional message includes: an identification sequence including a static part making it possible to identify the application message and its source and a variable part making it possible to distinguish the message in a unique manner, and a control sequence designed to check the integrity of the application message and based on a sequence representing a cyclic redundancy control code of the concatenation of at least one portion of the application message corresponding to said unit, with the identification sequence.

19 Claims, 3 Drawing Sheets

(51) Int. Cl.
*H04L 1/00* (2006.01)
*H04L 12/40* (2006.01)

(56) References Cited

U.S. PATENT DOCUMENTS

| | | | | |
|---|---|---|---|---|
| 7,613,830 B2* | 11/2009 | Srinivasan | .............. | H04L 51/14 |
| | | | | 370/389 |
| 8,375,217 B2* | 2/2013 | Schmidt | ................ | H04L 1/0057 |
| | | | | 700/78 |
| 8,787,574 B2* | 7/2014 | Hu | ........................ | H04L 63/065 |
| | | | | 380/255 |
| 2002/0170013 A1 | 11/2002 | Bolourchi et al. | | |

FOREIGN PATENT DOCUMENTS

WO  WO 2010/000965 A2  1/2010
WO  WO 2013/086456 A1  6/2013

OTHER PUBLICATIONS

Alena et al., Communications for Integrated Modular Avionics, Aerospace Conference 2007, IEEE, Piscataway, NJ, USA, Mar. 3, 2007, pp. 1-18.

* cited by examiner

TRANSMISSION SYSTEM FOR AVIONICS APPLICATION DATA

CROSS-REFERENCE TO RELATED APPLICATIONS

This application claims benefit under 35 U.S.C. §119 of French Application No. 13 02814, filed Dec. 3, 2013, which is herein incorporated by reference in its entirety.

BACKGROUND

Field

The described technology generally relates to a transmission system for avionics application data.

More particularly, the described technology relates to such a transmission system for transmitting avionics application data between data producing means and data consuming means, the application data being transmitted in the form of data transmission units, each transmission unit comprising:

at least one portion of an application message; and
an additional message containing identification and control information associated with that application message.

Description of the Related Technology

In general, the transmission of application data in avionics systems responds to a certain level of robustness required by aeronautic regulations. This level depends on the nature of the data to be transmitted and is higher when the data becomes more sensitive.

Thus, transmission systems in avionics systems make it possible not only to transmit data between data producing means and data consuming means, but also ensure the integrity of the transmitted data.

It is therefore important to be able to detect any transmission errors.

In practice, application data transmission errors are unavoidable. Thus, the application data transmission systems must make it possible to detect at least some of those errors. The proportion of detected errors varies based on the nature of the data.

Different application data transmission systems making it possible to detect at least part of the transmission errors already exist in the state of the art.

Such systems in particular make it possible to incorporate, in each transmission unit containing an application message, means for verifying the integrity of that application message.

Thus, for example, document WO 2010/000965 A2 describes a transmission system making it possible to incorporate an authentication block in the transmission unit containing an application message.

This authentication block is implemented by cryptographic techniques and is based on the application message and a key.

Furthermore, document FR 2878097 A1 also describes a transmission method of this nature implementing different codes to encode successive information symbol blocks.

SUMMARY OF CERTAIN INVENTIVE ASPECTS

One inventive aspect is a transmission system for transmitting avionics application data making it possible to detect the lack of integrity of an application message at a level compatible with aeronautic requirements.

Such a system does not use specific propagation mechanisms and applies to any type of communication network, for example those that are part of communication standard Aeronautical Radio, Incorporated (ARINC) 664.

To that end, the described technology relates to a transmission system for transmitting avionics application data, of the aforementioned type, in which the additional message comprises:

an identification sequence comprising a static part making it possible to identify the application message and its source and a variable part making it possible to distinguish the message in a unique and certain manner; and a control sequence designed to check the integrity of the application message and based on a main sequence representing a cyclic redundancy control code of the concatenation of at least one portion of the application message corresponding to said unit, with the identification sequence.

According to specific embodiments of the described technology, the system comprises one or more of the following features:

the control sequence and the identification sequence are separate;

the control sequence is the result of the application of the XOR operator between:
a sequence resulting from encoding of at least part of the identification sequence with a key represented by a field of the variable part of the identification sequence; and
the main sequence;

the control sequence is the result of the application of the XOR operator between:
a sequence resulting from encoding of at least part of the identification sequence with a key represented by a sequence that is variable over time and known by the producing and consuming means at all times; and
the main sequence;

the control sequence is the result of the application of the XOR operator between:
a sequence resulting from encoding of at least part of the identification sequence with a first key represented by encoding of a field of the variable part of the identification sequence with a second key represented by a sequence known by the producing and consuming means; and
the main sequence;

the control sequence is the result of the application of the XOR operator between:
a sequence resulting from encoding of at least part of the identification sequence with a first key represented by the result of the application of the XOR operator between:
a field of the variable part of the identification sequence; and
a sequence known by the producing and consuming means; and
the main sequence;

the control sequence is the result of the application of the XOR operator between:
a sequence resulting from encoding of at least part of the identification sequence and at least one portion of the application message with a key represented by a field of the variable part of the identification sequence; and
the main sequence;

the control sequence is the result of the application of the XOR operator between:

a sequence resulting from encoding of at least part of the identification sequence and at least one portion of the application message with a key represented by a sequence that is variable over time and known by the producing and consuming means at all times; and
the main sequence;
the control sequence is the result of the application of the XOR operator between:
a sequence resulting from encoding of at least part of the identification sequence and at least one portion of the application message with a first key represented by encoding of a field of the variable part of the identification sequence with a second key represented by a sequence known by the producing and consuming means; and
the main sequence;
the control sequence is the result of the application of the XOR operator between:
a sequence resulting from encoding of at least part of the identification sequence and at least one portion of the application message with a first key represented by the result of the application of the XOR operator between:
a field of the variable part of the identification sequence; and
a sequence known by the producing and consuming means; and
the main sequence;
the or each key is only known by the producing and consuming means to further make it possible to ensure authenticity of the messages;
for an application message formed by a plurality of sequenced portions, the control sequence of the transmission unit associated with the first portion is the result of the application of the XOR operator between:
a sequence resulting from encoding of a sequence represented by the result of the application of the XOR operator between:
at least part of the identification sequence corresponding to that portion; and
a predetermined initial value; and
the main sequence corresponding to that portion;
and the control sequence of the transmission unit associated with each subsequent portion is the result of the application of the XOR operator between:
an auxiliary sequence resulting from encoding of a sequence represented by the result of the application of the XOR operator between:
at least part of the identification sequence corresponding to that portion; and
an auxiliary sequence corresponding to the preceding portion and
the main sequence corresponding to that portion;
for an application message formed by a plurality of sequenced portions, the control sequence of the transmission unit associated with the first portion is the result of the application of the XOR operator between:
a sequence resulting from encoding of a sequence represented by the result of the application of the XOR operator between:
at least part of the identification sequence and at least a portion of the application message; and
a predetermined initial value; and
the main sequence corresponding to that portion;
and the control sequence of the transmission unit associated with each subsequent portion is the result of the application of the XOR operator between:
an auxiliary sequence resulting from encoding of a sequence represented by the result of the application of the XOR operator between:
at least part of the identification sequence and at least a portion of the application message; and
an auxiliary sequence corresponding to the preceding portion; and
the main sequence corresponding to that portion.
the control sequence is distributed in the identification sequence using a distribution law known by the producing and consuming means;
the distribution law is constant over time;
the distribution law varies over time;
the law is only known by the producing and consuming means to further make it possible to ensure the confidentiality of the messages;
the identification sequence comprises information chosen from the group further comprising:
identification information for the producing means of the corresponding application message,
identification information for the corresponding application message,
development order information for the corresponding application message,
development sequence number information for the corresponding application message,
development date information for the corresponding application message,
the additional message is associated with the application message in whole or portion thereof by portion.

BRIEF DESCRIPTION OF THE DRAWINGS

The described technology will be better understood upon reading the following description, provided solely as an example and done in reference to the appended drawings, in which.

DETAILED DESCRIPTION OF CERTAIN INVENTIVE EMBODIMENTS

Figure 1:
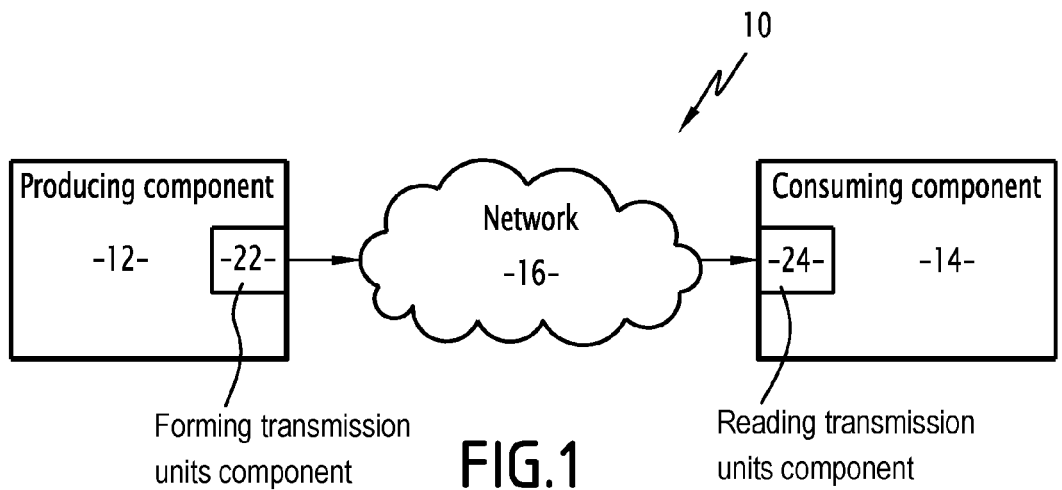
FIG. 1 is a diagrammatic view illustrating a transmission system for avionics application data according to an embodiment.

FIG. 1 shows an example of a transmission system 10 for avionics application data according to an embodiment.

This transmission system is usable in avionics systems.

Such a transmission system 10 for example comprises means for producing application data and means consuming such data, respectively designated by general references 12 and 14 in that FIG. 1.

The producing means or producing component 12 are shown using any means able to produce application data intended for the consuming means or consuming component 14. Such means for example comprise a piece of equipment, part of a piece of equipment, a sensor, a partition, an application, software and/or hardware.

Similarly, the consuming means 14 are represented by any means able to consume application data emitted by the producing means. Such means for example comprise a piece of equipment, part of a piece of equipment, an actuator, a partition, an application, software and/or hardware.

The producing and consuming means are for example onboard an aircraft.

The application data for example comprise piloting instructions for the aircraft.

Depending on their specific tasks, these instructions can be redundant and/or correspond to a certain level of robustness.

The producing and consuming means are connected to each other and the computer avionics communication network designated by general reference 16 in FIG. 1.

The network 16 comprises a plurality of hardware resources, for example cables physically connecting the producing and consuming means to each other and for example switches ensuring the transfer of digital data between those means.

Such a set of hardware resources forms a set of physical paths for the application data.

The network 16 also comprises a plurality of immaterial resources ensuring such a transfer at the software level.

Those resources for example comprise processing resources, storage resources or communication resources.

The computer network 16 is for example in accordance with communication standard ARINC 664.

The architecture of the network 16 can for example support the concept of integrated modular avionics (IMA).

The producing means 12 can transmit application data to the consuming means 14 using the same physical paths and the same immaterial resources of the network 16.

Figure 2:
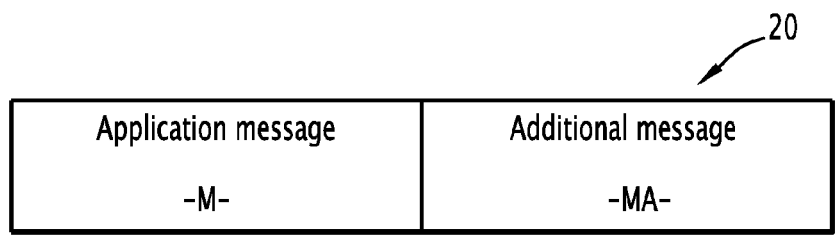
FIG. 2 is a diagrammatic view illustrating a transmission unit to be transmitted by the system of FIG. 1.

The application data are transmitted in the form of data transmission units. One example of such a transmission unit is diagrammatically shown in FIG. 2, where the transmission unit is designated by general reference 20.

The transmission unit 20 is formed by an application message M and an additional message MA for example comprising identification and control information associated with that application message.

The application message M for example represents an independent instruction emitted by the producing means 12 to the consuming means 14.

Alternatively, the transmission unit is formed by a portion P of the application message M and an additional message MA associated with that portion.

Thus, the message M is divided into a plurality of portions P, and each portion P is transmitted via the network 16 by a transmission unit.

Thus, the term "data transmission unit" used in the present description generally refers to the combination of an application message M or a portion P of that application message M, and an additional message MA within the meaning defined above.

Figure 3:
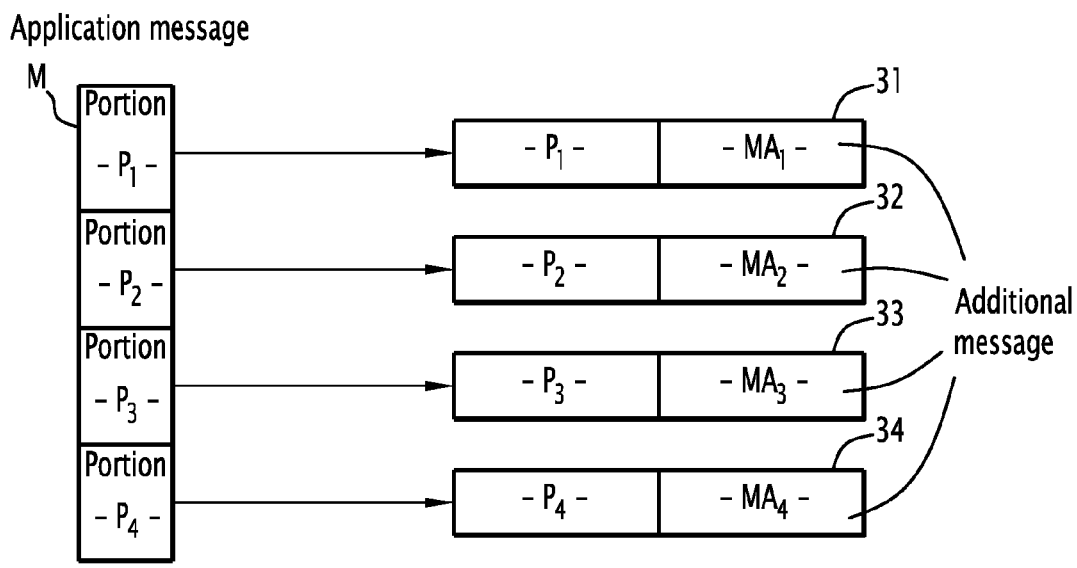
FIG. 3 is a diagram illustrating a division of an application message to be transmitted by the system of FIG. 1 into a plurality of portions.

FIG. 3 shows a message M divided into four portions $P_1$, $P_2$, $P_3$ and $P_4$. Those portions are transmitted via the network 16 by independent transmission units respectively designated by general references 31, 32, 33 and 34 in FIG. 3.

Each transmission unit 31, 32, 33 and 34 is formed by a corresponding portion $P_1$, $P_2$, $P_3$ and $P_4$ and by an additional message $MA_1$, $MA_2$, $MA_3$ and $MA_4$ for example comprising identification and control information associated with that portion.

Such a division makes it possible to optimize the coverage of the integrity mechanism by adapting the length of the portion to the intrinsic performance of the control used on the network 16.

This division further makes it possible to optimize the operation of the network 16 by adapting the length of the portion to the processing speed of that portion by the producing means 12 and the consuming means 14.

Within the producing means 12, such processing is performed by means for forming transmission units designated by general reference 22 in FIG. 1.

These means can for example divide the message M into portions P.

They are also able to form a transmission unit for each application message M or for each portion P of that message by adding an additional message associated with that application message M or that portion P. Lastly, the means for forming transmission units 22 are able to emit or transmit the transmission units formed in the network 16. Likewise, within the consuming means 14, the processing of the transmission units is done by transmission unit reading means designated by general reference 24 in FIG. 1.

The reading means 24 are able to receive a transmission unit and extract the application message, or the portion P of the application message M corresponding to that transmission unit, therefrom. The reading means 24 are also able to read the additional message MA corresponding to each received portion or message.

This additional message MA in particular allows the reading means 24 to verify the integrity of the received message M or portion P.

The reading means 24 are also able to reconstitute an application message M from the received portions P of that message.

In the rest of the present description, no further distinction will be made between an application message M and a portion P of an application message M. The term "application message M" will refer to an application message M or a portion P of an application message within the meaning defined above.

Figure 4:
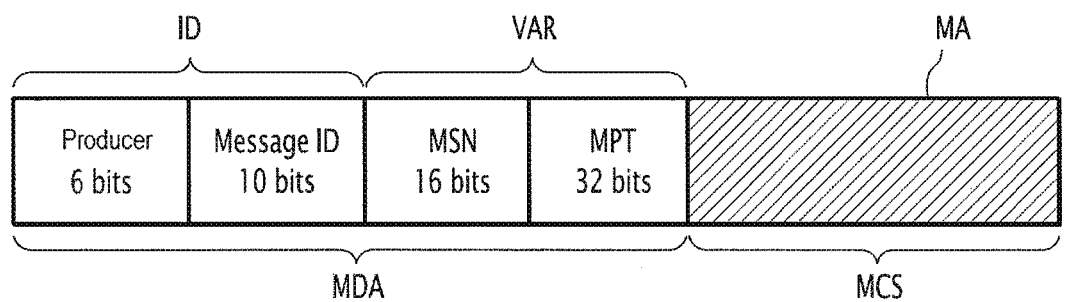
FIG. 4 is a diagrammatic view of an additional message without distribution that is part of the transmission unit of FIG. 2.

FIG. 4 diagrammatically illustrates an example of a structure of an additional message MA without associated distribution of an application message M.

This additional message MA can be formed by the means for forming transmission units 22 and read by the reading means 24 of FIG. 1.

Thus, according to FIG. 4, the additional message MA comprises an identification sequence MDA.

This identification sequence MDA is formed by a static part ID making it possible to identify the application message M and its source in the network and a variable part VAR making it possible to distinguish the application message M in a unique and certain manner, and in particular to distinguish two occurrences of the same message.

Thus for example, the static part ID comprises a first field and a second field.

The first field for example has a size of 6 bits and is for example formed by an identifier of the producer of the application message M.

This identifier uniquely identifies the producing means 12 that transmitted the message M in the network 16. It for example corresponds to the identifier of the source (Partition Id Source) in the case of the IMA architecture of type ARINC 653.

Alternatively, this identifier corresponds to the sensor member associated with the producing means 12.

Also alternatively, this identifier corresponds to the position of the producing means 12.

The second field for example has a size of 10 bits and is for example formed by an identifier of the application message M in the network 16.

The variable part VAR of the sequence MDA for example comprises a field MSN and a field MPT.

The field MSN for example has a size of 16 bits and is formed by a number corresponding to the development order of the application message M.

Alternatively, the field MSN could also associate the development order of the portion P for the same message order with the development order of the application message M.

The field MPT for example has a size of 32 bits and for example comprises the development date (moment) of the application message M.

The additional message MA further comprises a control sequence MCS designed to check the integrity of the application message, and is based on a main sequence SP.

The main sequence SP is for example represented by a cyclic redundancy code CRC of the concatenation of the application message, with the identification sequence MDA, i.e.:

$$SP=CRC(M\circ MDA)$$

where the symbol ∘ designates the concatenation operator.

The cyclic redundancy control code CRC is for example obtained using one or more generating polynomials.

According to a first embodiment, the control sequence is the result of the application of the XOR operator between an auxiliary sequence and the main sequence SP.

In this embodiment, the auxiliary sequence is a sequence resulting from encoding of at least part of the identification sequence MDA with a key represented by the field MPT of the identification sequence MDA.

Said part of the identification sequence MDA is for example represented by all or part of the static part ID and by all or part of the field MSN.

Such encoding is for example done with a Hash law (or other cryptographic primitives) with a key represented by the field MPT. Thus, the key is different from one application message M to another and is variable over time for the same producer.

Thus, the control sequence MCS can be determined using the following relationship:

$$MCS=XOR[E_{KeyA}(ID\circ MSN);SP]$$

where $E_{KeyA}$ designates the cryptographic primitive used (for example, the Hash law), and KeyA designates the key represented by the field MPT.

Alternatively, the encoding is applied to the static part ID, the field MSN and the application message M. This then yields the following relationship:

$$MCS=XOR[E_{KeyA}(ID\circ MSN\circ M);SP].$$

According to a second embodiment, the control sequence is the result of the application of the XOR operator between an auxiliary sequence and the main sequence SP.

In this embodiment, the auxiliary sequence is a sequence resulting from encoding of at least part of the identification sequence MDA and at least one portion of the application message with a key represented by a sequence that is variable over time.

This sequence is known by the producing and consuming means at all times.

Said part of the identification sequence MDA is for example represented by all or part of the static part ID and by all or part of the field MSN.

Such encoding is for example done with a Hash law with a cyclic change key.

Such a cyclic change in particular allows the producing and consuming means to know the key without having explicitly communicated it via the network 16.

Thus, the control sequence MCS can be determined using the following relationship:

$$MCS=XOR[E_{KeyA(t)}(ID\circ MSN);SP]$$

where KeyA(t) designates the cyclic key, which is variable over time.

Alternatively, the encoding is applied to the static part ID, the field MSN and the application message M. This yields the following relationship:

$$MCS=XOR[E_{KeyA(t)}(ID\circ MSN\circ M);SP].$$

According to a third embodiment, the control sequence is the result of the application of the XOR operator between an auxiliary sequence and the main sequence SP.

In this embodiment, the auxiliary sequence is a sequence resulting from encoding of at least part of the identification sequence MDA and at least one portion of the application message with a first key.

Such encoding is for example done with a Hash law.

Said part of the identification sequence MDA is for example represented by all or part of the static part ID and by all or part of the field MSN.

The first key is represented by encoding of the field MPT of the identification sequence MDA with a second key.

Such encoding is for example done by an encoding function with a key that is different from one message to the next and variable over time.

The second key [is] represented by a sequence known by the producing and consuming means.

This second key is known only by the affected consuming and producing means and is stored in their respective configuration tables.

This in particular means that the key cannot be known from the outside, which makes it possible to ensure the authenticity of the transmitted data.

Thus, the control sequence MCS can be determined using the following relationship:

$$MCS=XOR[E_{KeyA}(ID\circ MSN);SP]$$

where KeyA designates the first key defined by the relationship:

$$KeyA=F_{KeyB}(MPT)$$

where F designates the encoding function and KeyB designates the second key.

Alternatively, the first encoding is applied to the static part ID, the field MSN and the application message M. This yields the following relationship:

$$MCS=XOR[E_{KeyA}(ID\circ MSN\circ M);SP].$$

According to a fourth embodiment, the control sequence is the result of the application of the XOR operator between an auxiliary sequence and the main sequence SP.

In this embodiment, the auxiliary sequence is a sequence resulting from encoding of at least part of the identification sequence MDA and at least one portion of the application message with a first key.

Such encoding is for example done with a Hash law.

Said part of the identification sequence MDA is for example represented by the static part ID and by the field MSN.

The first key is represented by the result of the application of the XOR operator between the field MPT of the identification sequence MDA and a sequence known by the producing and consuming means.

This sequence is known only by the affected consuming and producing means and is stored in their respective configuration tables.

This in particular means that the key cannot be known from the outside, which makes it possible to ensure the authenticity of the transmitted data.

The first key is different from one application message M to another and varies over time.

Thus, the control sequence MCS can be determined using the following relationship:

$$MCS=XOR[E_{KeyA}(ID \circ MSN);SP]$$

where KeyA designates the first key defined by the relationship:

$$KeyA=XOR[KeyB;MPT]$$

where KeyB designates the sequence known by the producing and consuming means.

Alternatively, the first encoding is applied to the static part ID, the field MSN and the application message M. This yields the following relationship:

$$MCS=XOR[E_{KeyA}(ID \circ MSN \circ M);SP].$$

In the four embodiments described above, when an application message M refers to a portion P of an application message M, i.e., when the application message M is divided into a plurality of portions P, the creation of the part MCS of the additional message MA associated with a portion P is independent of the other portions P of the same application message. Thus, in the four embodiments described above, the method for checking the integrity of an application message M is said to be "without chaining".

Hereinafter, Seq denotes the input sequence of the cryptographic primitive $E_{KeyA}$, represented for example by the Hash law, according to one of the four preceding embodiments.

According to a fifth embodiment, the input sequence of the cryptographic primitive $E_{KeyA}$ of the first portion P of an application message M is the result of the application of the XOR operator between the sequence Seq corresponding to the first portion P and a predetermined initial value IV, i.e.:

$$MCS_1=XOR[E_{KeyA}(XOR[Seq_1;IV]);SP].$$

The input sequence for the encoding of the following portions P of the same application message is the result of the application of the XOR operator between the sequence Seq and an auxiliary sequence calculated for the preceding portion:

$$MCS_i=XOR[E_{KeyA}(XOR[Seq_i;SA_{i-1}]);SP],$$

where i designates the number of the portion P in the application message M, $SA_{i-1}$ designates the auxiliary sequence calculated for the portion P having the number i-1, i.e.:

$$SA_i=E_{KeyA}(XOR[Seq_i;SA_{i-1}]) \text{ and } SA_1=E_{KeyA}(XOR[Seq_1;IV]).$$

Thus, this embodiment is recursive and is said to be "with chaining".

Figure 5:
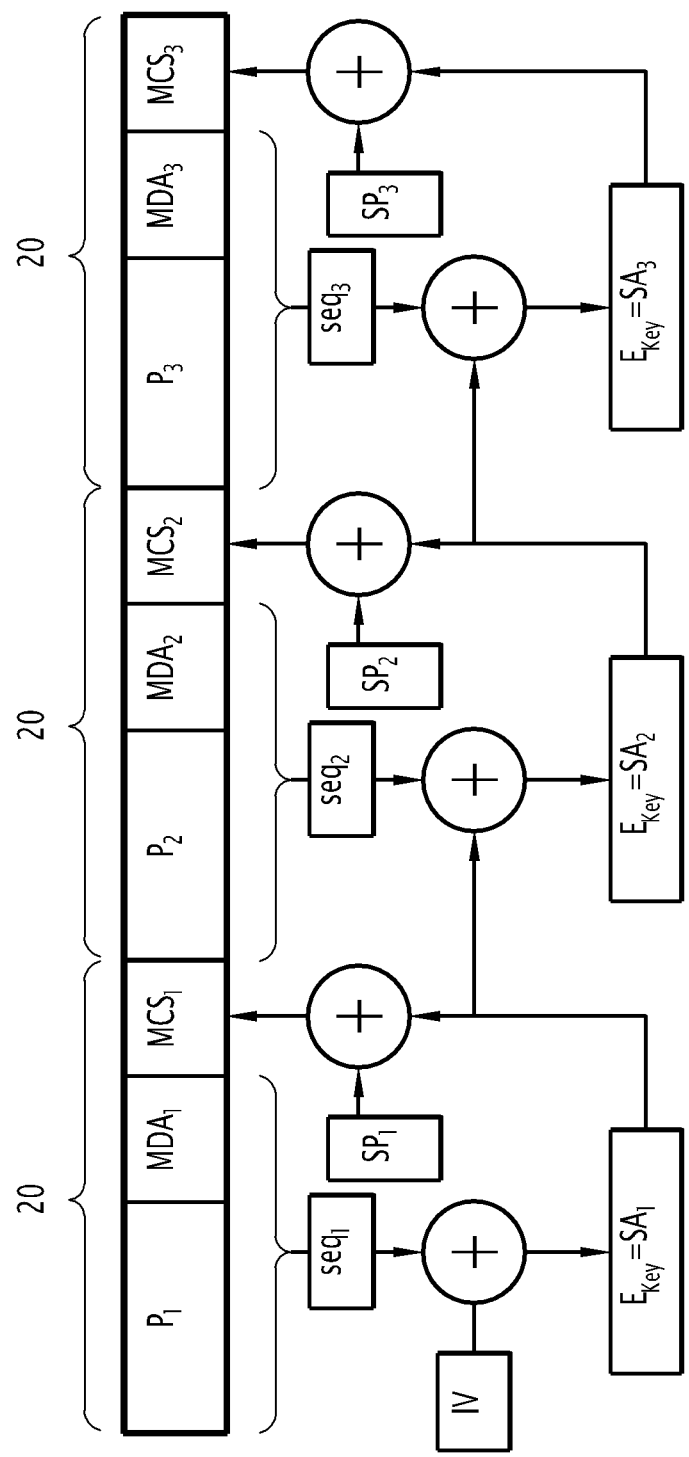
FIG. 5 is a flowchart illustrating a fifth embodiment.

This embodiment is also explained by the flowchart of FIG. 5.

In this FIG. 5, an application message M is divided into three portions designated by general references $P_1$, $P_2$ and $P_3$. Each portion of this message can be transmitted by a transmission unit.

Thus, as illustrated in FIG. 5, the control sequence $MCS_1$ corresponding to the first portion $P_1$ is obtained according to the formulas above using a first auxiliary sequence $SA_1$. This first auxiliary sequence $SA_1$ is also obtained using the corresponding sequence $Seq_1$ and the initial value IV.

The control sequence $MCS_2$ corresponding to the second portion $P_2$ is obtained according to the above formulas using a second auxiliary sequence $SA_2$. This second auxiliary sequence $SA_2$ is also obtained using the corresponding sequence $Seq_2$ and the first auxiliary sequence $SA_1$.

The control sequence $MCS_3$ corresponding to the third portion $P_3$ is obtained similarly.

In the five embodiments described above, the sequences MDA and MCS are separate, as shown in FIG. 4. Thus, in these embodiments, the additional message MA is said to be "without distribution".

According to a sixth embodiment, the control sequence MCS is distributed in the identification sequence MDA using a distribution law.

Thus, in this embodiment, the additional message MA is said to be "with distribution".

Figure 6:
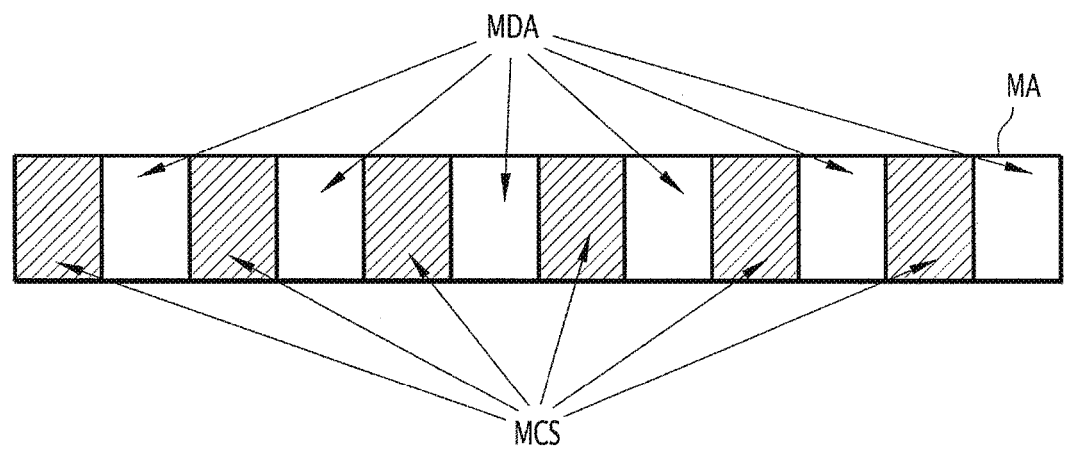
FIG. 6 is a diagrammatic view of an additional message with distribution that is part of the transmission unit of FIG. 2.

FIG. 6 diagrammatically illustrates an example of a structure of an additional message MA with distribution associated with an application message M.

This distribution law is known by the producing and consuming means.

It for example defines same fixed positions of the portions of the sequence MCS in the sequence MDA for all of the application messages M.

Alternatively, this law for example defines variable positions of the portions of the sequence MCS in the sequence MDA for different application messages, for example based on the occurrence of one application message M on the other.

In the latter case, the distribution law therefore varies over time.

The formation means 22 make it possible to form an additional message MA comprising the control sequence MCS distributed in the identification sequence MDA using that law.

Likewise, the reading means 24 are able to extract the control sequence MCS from the identification sequence MDA using that law.

In this embodiment, the control sequence MCS is for example equal to the main sequence, i.e.:

$$MCS=SP.$$

In other words, this control sequence MCS is created without any encoding.

Alternatively, the control sequence MCS is created using one of the five techniques corresponding to the first five embodiments.

Of course, many other combinations of embodiments are also possible.

The operation of the transmission system 10 according to an embodiment will now be described.

An instruction produced by the producing means 12 intended for the consuming means 14 is first transformed into an application message M.

That application message M is next processed by the means for forming transmission units 22.

In those means 22, the application message M is divided into a plurality of portions P. Such a division is for example done based on the length of the message M.

This division in particular makes it possible to optimize the operation of different components of the network 16 based on the processing speed of the data.

In some cases, the message M is not divided.

Next, the means for forming transmission units 22 associate an additional message MA with that application message M or a portion P corresponding to that message M.

The additional message MA contains identification and control information associated with that application message M.

Thus, means 22 first build an identification sequence MDA. That sequence can be associated with the entire application message M or a portion P thereof.

The means 22 next build a control sequence MCS using one of the building techniques described above.

For the sixth embodiment, the means for forming transmission units 22 additionally distribute the control sequence MCS in the identification sequence MDA using a distribution law.

Thus, the application message, or the portion P and the associated additional message MA, form a transmission unit that is next transmitted in the network 16.

After the consuming means 14 receive the transmission unit, the entire application message or the portion P thereof is first verified by the reading means 24.

Thus, the reading means first extract the application message M or the portion P thereof from the received transmission unit.

For the sixth embodiment, the reading means 24 additionally extract the control sequence MCS from the identification sequence MDA using the distribution law.

The reading means 24 next build a control sequence MCS' using the received message M or the portion P thereof and the received sequence MDA.

This construction is based on the same construction technique used by the means for forming transmission units 22.

Next, the reading means 24 compare the received control sequence MCS with the reconstructed control sequence MCS'.

If the two sequences are identical, the transmission of the message M or the portion P thereof has been done with no error.

If the two sequences are not identical, the transmission of the message or the portion P thereof has been done with errors.

After all of the portions P corresponding to the same application message M have been received, the reading means 24 reconstruct that message M and next transmit it in the consuming means 14.

Of course, other embodiments can also be considered.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

The invention claimed is:

1. A transmission system for transmitting avionics application data between data producing component and data consuming component, the application data being transmitted in the form of data transmission units, each transmission unit comprising:
   at least one portion of an application message; and
   an additional message containing identification and control information associated with that application message;
   wherein the additional message comprises:
      an identification sequence comprising a static part identifying the application message and its source and a variable part distinguishing the message in a unique and certain manner; and
      a control sequence designed to check the integrity of the application message and based on a main sequence representing a cyclic redundancy control code of the concatenation of at least one portion of the application message corresponding to the unit, with the identification sequence,
   wherein the static part of the identification sequence further comprises an identifier of the producing component having produced the corresponding application message, and
   wherein the variable part of the identification sequence comprises a development date of the corresponding application message.

2. The transmission system according to claim 1, wherein the control sequence and the identification sequence are different.

3. The transmission system according to claim 2, wherein the control sequence is the result of the XOR operator between:
   a sequence resulting from encoding of at least part of the identification sequence with a key represented by a field of the variable part of the identification sequence; and
   the main sequence.

4. The transmission system according to claim 2, wherein the control sequence is the result of the XOR operator between:
   a sequence resulting from encoding of at least part of the identification sequence with a key represented by a sequence that is variable over time and known by the producing and consuming components at all times; and
   the main sequence.

5. The transmission system according to claim 2, wherein the control sequence is the result of the XOR operator between:
   a sequence resulting from encoding of at least part of the identification sequence with a first key represented by encoding of a field of the variable part of the identification sequence with a second key represented by a sequence known by the producing and consuming components; and
   the main sequence.

6. The transmission system according to claim 2, wherein the control sequence is the result of the XOR operator between:
   a sequence resulting from encoding of at least part of the identification sequence with a first key represented by the result of the application of the XOR operator between:

a field of the variable part of the identification sequence; and
a sequence known by the producing and consuming components; and
the main sequence.

7. The transmission system according to claim 2, wherein the control sequence is the result of the XOR operator between:
a sequence resulting from encoding of at least part of the identification sequence and at least one portion of the application message with a key represented by a field of the variable part of the identification sequence; and
the main sequence.

8. The transmission system according to claim 2, wherein the control sequence is the result of the XOR operator between:
a sequence resulting from encoding of at least part of the identification sequence and at least one portion of the application message with a key represented by a sequence that is variable over time and known by the producing and consuming components at all times; and
the main sequence.

9. The transmission system according to claim 2, wherein the control sequence is the result of the XOR operator between:
a sequence resulting from encoding of at least part of the identification sequence and at least one portion of the application message with a first key represented by encoding of a field of the variable part of the identification sequence with a second key represented by a sequence known by the producing and consuming components; and
the main sequence.

10. The transmission system according to claim 2, wherein the control sequence is the result of the application of the XOR operator between:
a sequence resulting from encoding of at least part of the identification sequence and at least one portion of the application message with a first key represented by the result of the application of the XOR operator between:
a field of the variable part of the identification sequence; and
a sequence known by the producing and consuming components; and
the main sequence.

11. The transmission system according to claim 3, wherein the or each key is only known by the producing and consuming components to ensure authenticity of the messages.

12. The transmission system according to claim 3, wherein, for an application message formed by a plurality of sequenced portions, the control sequence of the transmission unit associated with the first portion is the result of the application of the XOR operator between:
a sequence resulting from encoding of a sequence represented by the result of the application of the XOR operator between:
at least part of the identification sequence corresponding to that portion; and
a predetermined initial value; and
the main sequence corresponding to that portion;
and the control sequence of the transmission unit associated with each subsequent portion is the result of the application of the XOR operator between:
an auxiliary sequence resulting from encoding of a sequence represented by the result of the application of the XOR operator between:
at least part of the identification sequence corresponding to that portion; and
an auxiliary sequence corresponding to the preceding portion; and
the main sequence corresponding to that portion.

13. The transmission system according to claim 3, wherein, for an application message formed by a plurality of sequenced portions, the control sequence of the transmission unit associated with the first portion is the result of the application of the XOR operator between:
a sequence resulting from encoding of a sequence represented by the result of the application of the XOR operator between:
at least part of the identification sequence and at least a portion of the application message; and
a predetermined initial value; and
the main sequence corresponding to that portion;
and the control sequence of the transmission unit associated with each subsequent portion is the result of the application of the XOR operator between:
an auxiliary sequence resulting from encoding of a sequence represented by the result of the application of the XOR operator between:
at least part of the identification sequence and at least a portion of the application message; and
an auxiliary sequence corresponding to the preceding portion; and
the main sequence corresponding to that portion.

14. The transmission system according to claim 3, wherein the control sequence is distributed in the identification sequence using a distribution law known by the producing and consuming components.

15. The transmission system according to claim 14, wherein the distribution law is constant over time.

16. The transmission system according to claim 14, wherein the distribution law varies over time.

17. The transmission system according to claim 14, wherein the distribution law is only known by the producing and consuming components to ensure confidentiality of the messages.

18. The transmission system according to claim 1, wherein the identification sequence further comprises at least one of:
identification information for the corresponding application message,
development order information for the corresponding application message, and
development sequence number information for the corresponding application message.

19. The transmission system according to claim 1, wherein the additional message is associated with the application message in whole or portion thereof by portion.

* * * * *